A. L. PUTNAM.
METALLIC WHEEL.
APPLICATION FILED AUG. 23, 1915.
1,242,590.
Patented Oct. 9, 1917.
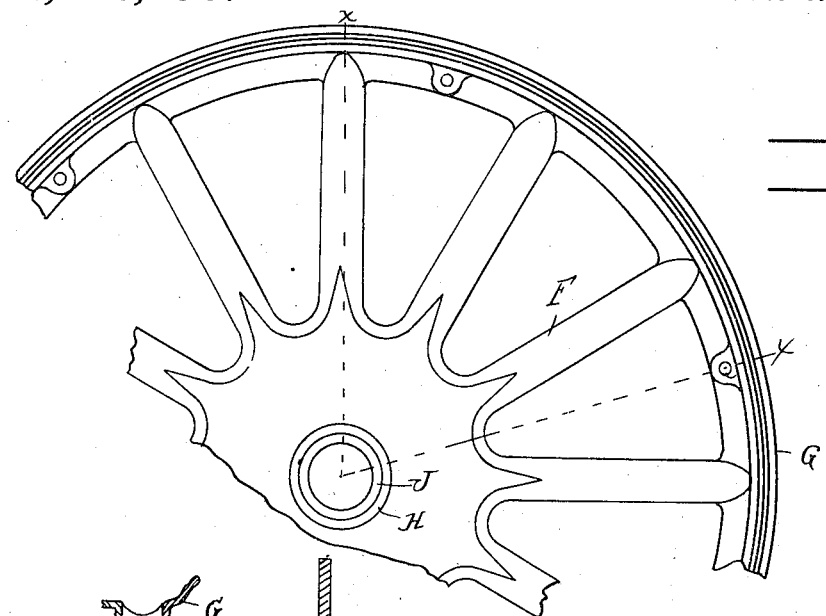
Fig. 1.
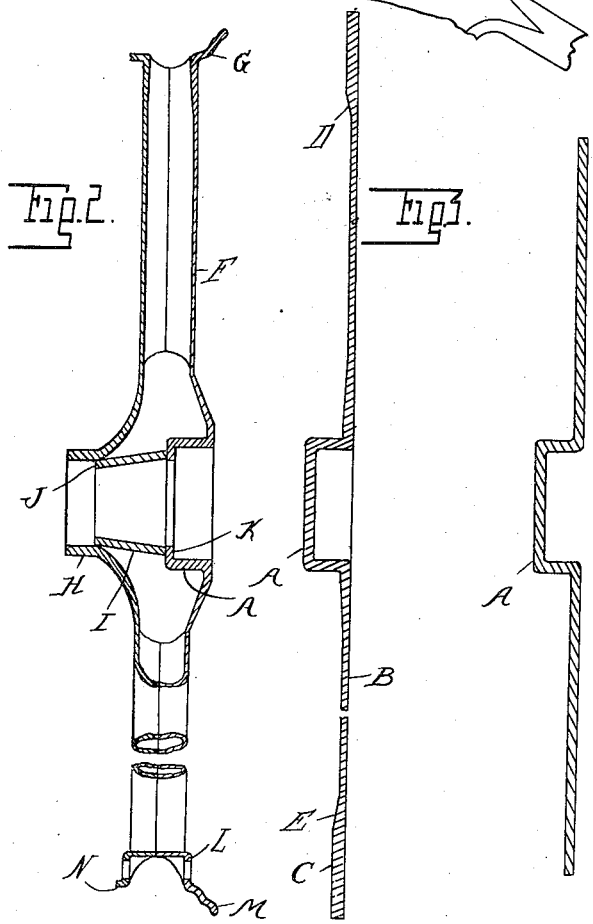
Fig. 2.
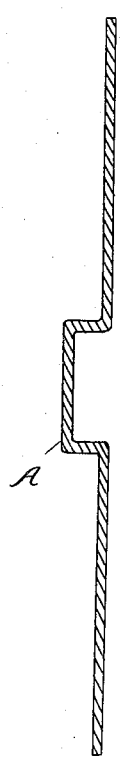
Fig. 3.
Fig. 4.
Inventor
Alden L. Putnam
By Whittemore Hulbert & Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

METALLIC WHEEL.

1,242,590.  Specification of Letters Patent.  Patented Oct. 9, 1917.

Application filed August 23, 1915. Serial No. 46,920.

*To all whom it may concern:*

Be it known that I, ALDEN L. PUTNAM, a citizen of the United States of America, residing at Detroit, in the county of Wayne and State of Michigan, have invented certain new and useful Improvements in Metallic Wheels, of which the following is a specification, reference being had therein to the accompanying drawings.

The invention relates to metallic wheels for vehicles, and it is one of the objects of the invention to form from an integral blank, hub, spoke and rim sections simulating a wooden wheel, and properly proportioned in strength. Heretofore wheels formed from integral blanks have been defective, due to the fact that greater thickness is required for the hub section than is necessary for the spoke and rim sections, and greater thickness is required for the rim section than for the spoke sections. Thus if the blank is of sufficient gage for the hub the wheel is unnecessarily heavy, and the stresses are not properly proportioned. On the other hand, if the gage of the metal is suitable for the spokes or rim it is too light for the hub. With my improved construction the wheel is formed from a blank of varying thickness so that the hub portion will be of greater gage than the rim, and the rim of greater gage than the spokes. Another feature of the invention is the construction of the hub from portions of complementary blanks, and the connecting of said hub sections to each other as hereinafter set forth. Still another feature is the construction of the rim which simulates a wooden felly, and a further feature is the manner of forming bearings on said felly for the attachment of a demountable rim.

In the drawings:

Figure 1 is an elevation of a portion of the wheel;

Fig. 2 is a longitudinal section on line *x—x* Fig. 1;

Fig. 3 is a section through the blank from which one of the wheel sections is formed; and Fig. 4 is a similar view, showing the first step in the formation of the wheel section.

My improved wheel is, as above stated, formed of complementary sections joined in the central plane of the wheel, and each preferably comprising integral hub, spoke and rim portions. To secure the proper strength in the respective parts the hub portion is of greater gage than the rim, and the rim portion of greater gage than the spokes. This result is secured by first forming a blank as shown in Fig. 4, having a cupped central portion A for forming the hub, a thinned intermediate portion B and an outer portion C, of a gage intermediate that of the portions B and A. The change in thickness is made gradual by tapering portions D and E, and the relative diameters of the several portions is such as to be suitable for the parts which they are to form.

From this blank the wheel section is fashioned so as to form a series of channel section spokes F, with the metal intermediate the same cut away. The outer portion C of the blank is also properly fashioned to form the rim G, while the central portion A, together with the tapering portion B forms the hub. The two complementary sections of the wheel are similarly formed but in one section the hub portion H is of lesser diameter to correspond to the usual tapering form of a wheel hub. The complementary sections are secured to each other preferably by electric welding, and the two hub sections are connected or stayed to each other, preferably by a sleeve I arranged therebetween, and electrically welded or otherwise secured thereto. The end of this sleeve at the smaller end of the hub forms a shoulder J for end thrust of one of the hub bearings, while a shoulder K for end thrust of the other bearing is formed by the cup.

In order to simulate the wooden wheel, the rim G is preferably fashioned to the same cross-sectional contour. This also greatly strengthens the structure by the substitution of a channel or other structural shape for that of a flat bar. Still another advantage is that it permits of forming bearings L in the felly intermediate the spokes, which are adapted to receive the fittings for attachment of a demountable rim (not shown). On one side of the felly a flange M projects to form a shoulder for the demountable rim, while on the opposite side the flange N is restricted in diameter, so that the demountable rim may be sleeved thereover.

With the construction as described, the hub being formed of the heavy gaged portion of the blank will be of sufficient strength without the use of filler blocks or other reinforcement, such as have heretofore been used in most sheet metal constructions. The felly also is formed of heavier gage metal than the spokes but lighter than that of the hub, and thus the whole structure of the wheel is proportioned so as to give the maximum strength with the minimum weight.

What I claim as my invention is:—

1. In a metallic wheel, an annular portion and spaced spoke portions formed of pressed sheet-metal, the gage of the metal in said annular portion being materially greater than that of said spoke portions.

2. In a metallic wheel, an annular portion and integral spaced spoke portions formed from a pressed sheet-metal blank, the gage of the metal of said annular portion being materially greater than that of said spoke portions, and an intermediate portion of tapering gage at the ends of the spokes.

3. In a metallic wheel, a hub portion and integral spaced spoke portions formed from a pressed sheet-metal blank, the gage of the metal in the hub portion being materially greater than that in the spoke portions.

4. In a metallic wheel, a hub portion, rim portion and intermediate spaced spoke portions, all formed from an integral pressed sheet-metal blank, the gage of the metal of the hub and rim portions being greater than the gage of the metal of the spoke portions.

5. In a metallic wheel, a hub portion, a rim portion and spaced spoke portions, all formed of an integral pressed sheet-metal blank, the gage of the metal of the hub portion being greater than the gage of the metal of the rim portion and the latter being greater than the gage of the spoke portions.

6. A metallic wheel, comprising complementary pressed sheet metal blanks abutting and united in the central plane of the wheel, each blank comprising integral hub and spoke sections, the gage of the metal of the hub section being greater than that of the spoke section, one of said hub sections being of inwardly-cupped form, and a stay member connecting said inwardly-cupped portion with the complementary hub portion.

7. In a metallic wheel, complementary pressed sheet metal sections united in the central plane of the wheel, each section comprising integral hub and spoke portions, the gage of the hub portion being greater than that of the spoke portion, one of said hub sections having an inwardly-cupped form, and a sleeve extending from said inwardly-cupped portion to the complementary hub portion and united thereto to form a stay.

8. In a metallic wheel, hub, spoke and felly portions pressed and fashioned from an integral sheet-metal blank, the felly portion providing a seat for a demountable rim.

9. In a metallic wheel, hub and spoke portions formed from an integral pressed sheet-metal blank, the gage of the metal of the hub being greater than that of the spokes and said hub being fashioned to form a seat for the axle bearing.

10. In a metallic wheel, complementary pressed sheet metal sections abutting and secured to each other in the central plane of the wheel, each section comprising integral hub and spoke portions, the hub portion of one section being inwardly-cupped and forming a pocket for receiving one of the wheel bearings, and the other hub sections forming an outwardly-extending tube, and a sleeve connecting said inwardly-cupped portion with said outwardly-extending tube portion and forming an abutment in the latter for an outer wheel bearing.

11. A metallic wheel, comprising complementary pressed sheet-metal sections united in the central plane of the wheel, each section comprising integral hub, spoke and felly portions, the latter being of channel section providing on one side thereof a seat for a demountable rim, and said felly also having apertured embossed portions intermediate spokes for receiving the rim clamping bolts.

12. A metallic wheel, comprising integral pressed sheet-metal hub and spoke sections, the gage of the metal of the hub being greater than that of the spokes, there being a portion intermediate spokes and hub gradually varying from the gage of one to that of the other.

13. In a metallic wheel, complementary pressed sheet-metal sections abutting in the central plane of the wheel, each comprising hub and spoke portions, one of said hub portions being fashioned into an outwardly-extending tube, and the other hub section being inwardly-cupped to extend in proximity to said outer section, and connecting means between said sections at the proximate points thereof.

In testimony whereof I affix my signature in presence of two witnesses.

ALDEN L. PUTNAM.

Witnesses:
 Wm. J. Belknap,
 James P. Barry.